Dec. 6, 1949     E. J. CARLETON     2,490,509
ROTARY FOLLOW VALVE
Filed Jan. 26, 1945     3 Sheets-Sheet 1
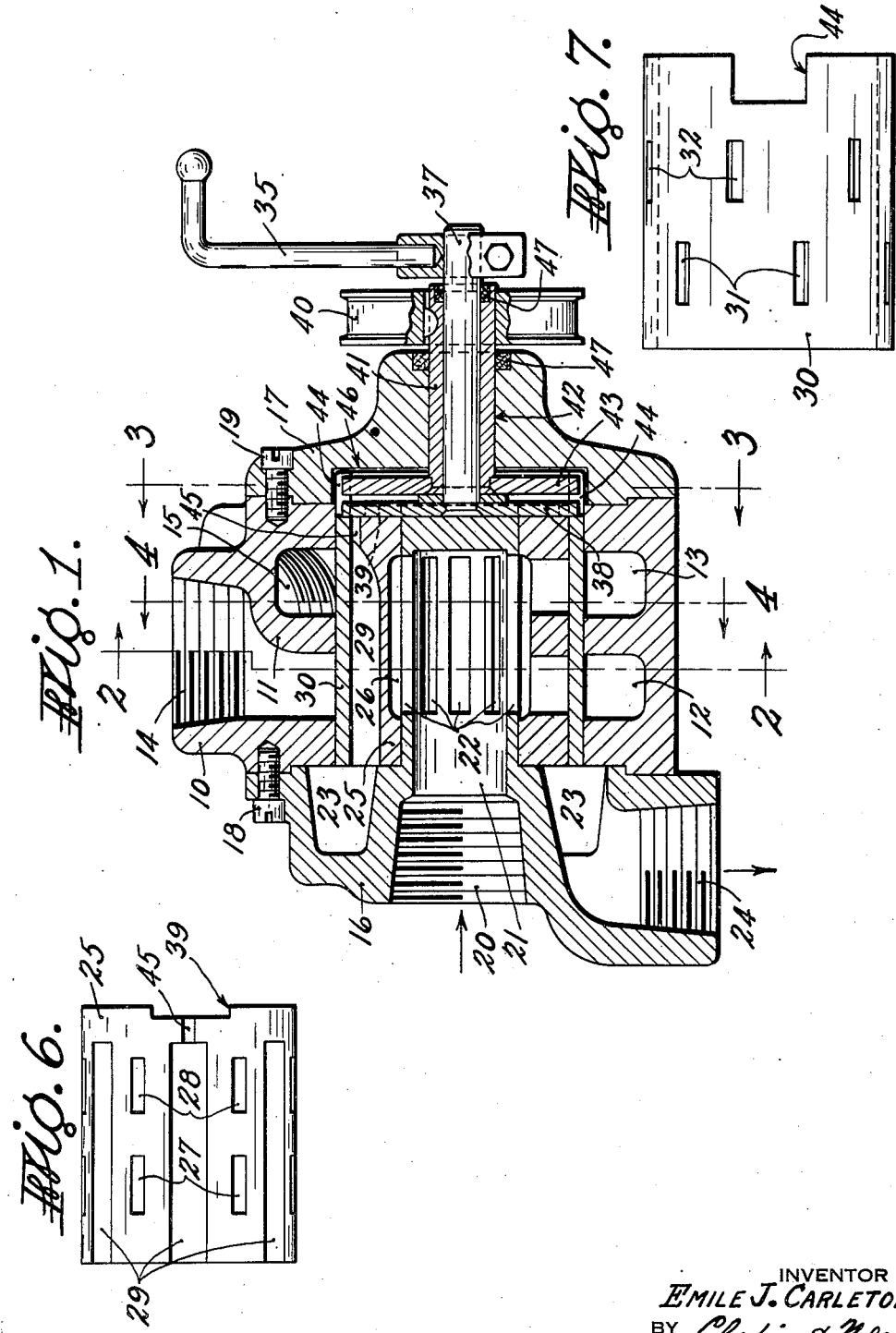
INVENTOR
EMILE J. CARLETON
BY Chapin & Neal
ATTORNEYS Dec. 6, 1949   E. J. CARLETON   2,490,509
ROTARY FOLLOW VALVE Filed Jan. 26, 1945   3 Sheets-Sheet 2

INVENTOR
EMILE J. CARLETON
BY Chapin & Neal
ATTORNEYS

Dec. 6, 1949 E. J. CARLETON 2,490,509
ROTARY FOLLOW VALVE
Filed Jan. 26, 1945 3 Sheets-Sheet 3
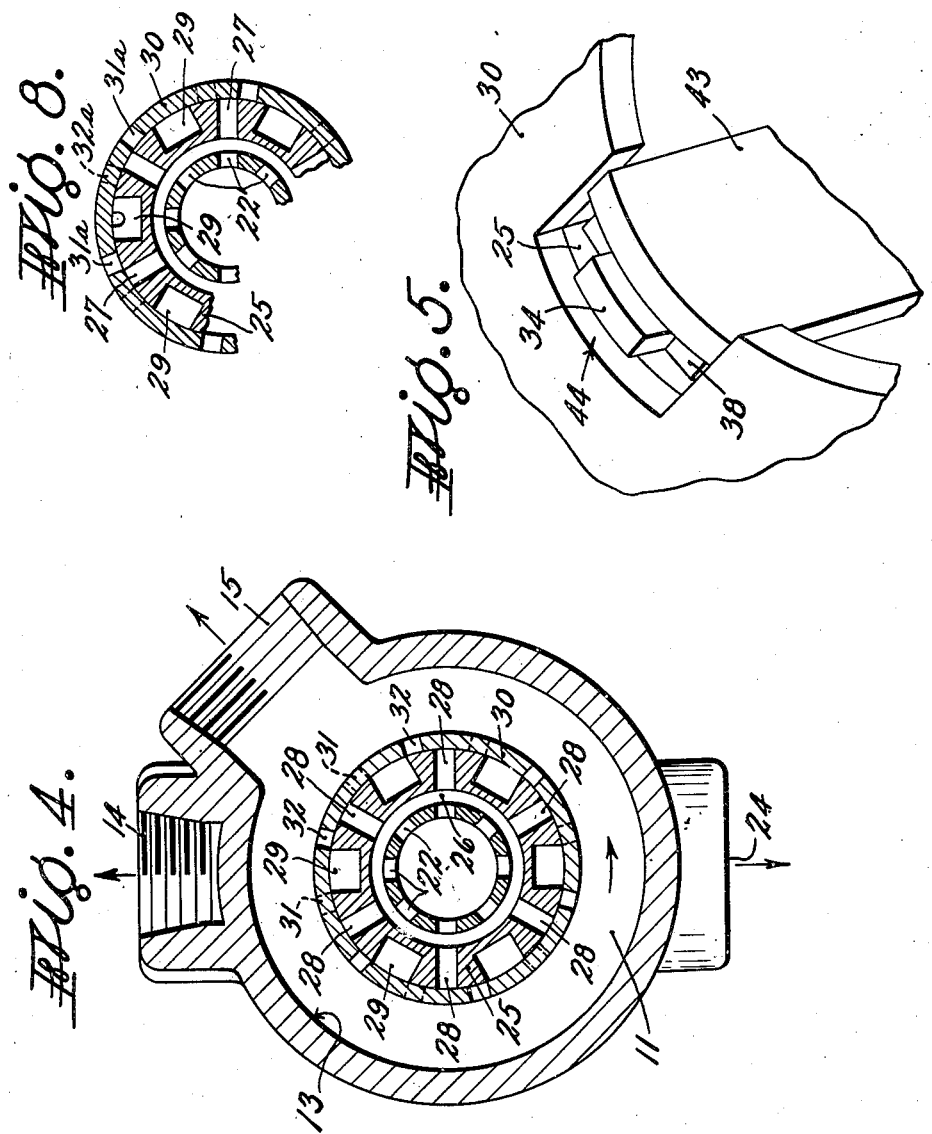
INVENTOR
EMILE J. CARLETON
BY Chapin & Neal
ATTORNEYS Patented Dec. 6, 1949

2,490,509

UNITED STATES PATENT OFFICE 2,490,509

ROTARY FOLLOW VALVE

Emile J. Carleton, Holyoke, Mass., assignor to Hydraulic Engineering Co. Inc., Holyoke, Mass., a corporation of Massachusetts Application January 26, 1945, Serial No. 574,711

1 Claim. (Cl. 121—41)

This invention relates to an improved follow valve for controlling fluid pressure operated cylinders, motors, and similar devices.

The principal object of the invention is to provide a valve of simple and efficient construction which may be operated through as many complete rotations in either direction as is desired so that the motor served by the valve may be permitted to operate in either direction at desired speed for as long as desired.

Other and more specific objects will be made apparent in the following specification and claim.

In the accompanying drawings which illustrate one embodiment of the invention,

Fig. 1 is a longitudinal sectional view substantially on line 1—1 of Fig. 2;

Fig. 4 is a sectional view substantially on line 4—4 of Fig. 1;

Fig. 5 is a fragmentary perspective view showing the relationship of the driving cross heads;

Fig. 6 is a detail plan view of the inner sleeve;

Fig. 7 is a similar detail view of the outer sleeve; and

Fig. 8 is a fragmentary sectional view similar to Fig. 2, but showing a modified arrangement of the ports in the outer sleeve.

Figure 3:
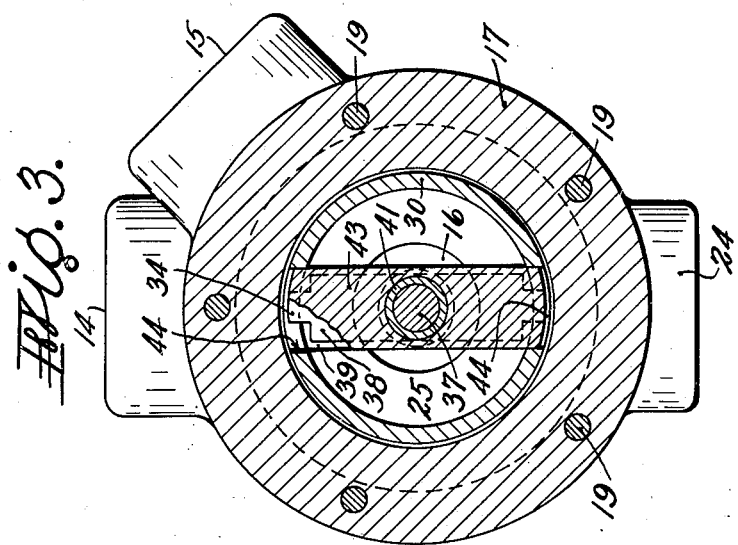
Fig. 3 is a sectional view substantially on line 3—3 of Fig. 1.

As shown in the drawings the structure comprises an annular casing 10 formed with a center wall 11 forming two annular chambers 12 and 13 respectively provided with service outlet openings 14 and 15 adapted to be connected to opposite ends of a hydraulic cylinder or other motor or device to be served by the valve. The ends of casing 10 are closed by members 16 and 17 secured to the casing by machine screws as at 18 and 19. End member 16 is provided with an axial opening 20 adapted to be connected to a suitable source of fluid pressure. A hollow cylindrical chamber 21 formed integral with end member 16 extends axially into casing 10 from the power supply opening 20 and is provided with a plurality of radial ports 22. End member 16 is also formed with a generally circular chamber 23 communicating with an exhaust opening 24.

Rotatably mounted on member 21 is sleeve 25 provided on its inner face with an annular groove 26 with which power supply ports 22 are in constant communication. Sleeve 25 is also provided with a plurality of circumferential spaced ports 27 extending radially from groove 26 and an equal number of similarly arranged ports 28 in spaced axial alignment with ports 27. Power fluid is thus constantly supplied to both sets of ports 27 and 28 from chamber 21. A plurality of axially extending grooves 29 are formed on the outside of sleeve 25 which grooves open endwise into constant communication with the exhaust chamber 23.

Rotatably mounted on sleeve 25 is a second sleeve 30. Sleeve 30 is formed with a plurality of radially extending circumferentially spaced ports 31 which are constantly open to chamber 12 and a plurality of similarly arranged ports 32 which are constantly open to chamber 13. As best shown in Fig. 7 ports 31 and 32 are staggered with respect to each other.

Sleeve 25 is adapted to be rotated with respect to sleeve 30, through a limited distance in either direction, by a manually operated crank 35 secured to the end of a shaft 37. A cross bar 38, rigidly secured to the inner end of shaft 37, fits in diametrically opposite recesses 39 formed in the adjacent edge of sleeve 25.

Sleeve 30 is adapted to be rotated with respect to sleeve 25 by a pulley 40 keyed to the outer end of a hollow shaft 41 rotatably mounted on shaft 37 and in a bearing 42 formed in member 17. A cross bar 43, rigidly secured to the inner end of shaft 41, fits in diametrically opposite recesses 44 formed in the adjacent edge of sleeve 30 in radial alignment with the recesses 39 in sleeve 25. Cross bar 38 is provided with narrowed extensions 34 which extend into the recesses 44 providing a lost motion connection between the sleeves and by contact with the sides of recess 44 limit the relative movement between the sleeves. Passages 45 from two of the grooves 29 to the chamber 46 in which cross bars 38 and 43 operate equalize the pressure at the ends of the sleeves. Pressure packings 47 around shafts 37 and 41 are provided to prevent leakage of the pressure fluid.

Pulley 40 is adapted to be driven from the fluid pressure motor served by the valve through openings 14 and 15.

Figure 2:
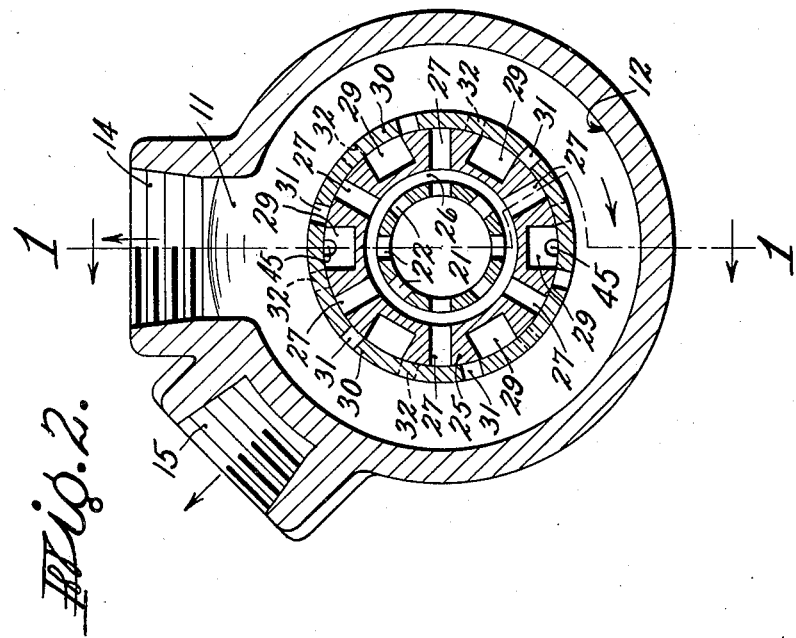
Fig. 2 is a sectional view substantially on line 2—2 of Fig. 1.

When the members are in the position shown in Figs. 2 and 4, it will be seen that the supply ports 27—28 and the exhaust grooves 29 are all closed by sleeve 30. As will be apparent from Figs. 2 and 4 clock-wise movement of sleeve 25 in Fig. 2 (which appears as counterclockwise when viewed from the opposite side of the valve as in Fig. 4) by crank 35 will first bring all of the ports 31 into communication with the adjacent exhaust grooves 29, thus exhausting chamber 12 and that side of the motor piston connected to outlet 14 of chamber 12. Further movement of sleeve 25 by crank 35 brings all the power supply ports 22 into communication with chamber 13 through ports 32, thereby admitting fluid under pressure to chamber 13 and through outlet 15 of chamber 13 to the other side of the motor piston to which it is connected.

As above stated shaft 41 is adapted to be driven, through pulley 40, from the motor served by the valve. As power is supplied to the motor, pulley 40 is rotated to move sleeve 30 in the direction of movement of sleeve 25 and if movement of sleeve 25 is stopped pulley 40 will continue to move sleeve 30 until the power ports 27 are again closed shutting off the fluid motor and bringing sleeve 30 to rest. As long as sleeve 25 is rotated by crank 35 to maintain the desired degree of opening of the ports, sleeve 30 will follow sleeve 25 and the speed of the motor can be controlled by permitting sleeve 30 to catch up and throttle down the port openings or by advancing the crank to increase the port openings. Reverse movement of the crank 35 will act first to restore the ports to the position shown in Figs. 2 and 4, thereby stopping the motor. Continued reverse movement of the crank will bring all the ports 32 into communication with the adjacent exhaust grooves 29 thereby exhausting chamber 13, and continued reverse movement will bring power ports into communication with chamber 12 through ports 31 thus reversing the motor.

Contact of extensions 34 with the sides of recess 44 prevents sleeve 25 overrunning full open position in either direction.

It will be seen that by the arrangement described, the sleeve 25 and 30 may be rotated through as many complete rotations in either direction for as long as it is desired to operate the motor in that direction, and that the motor will stop whenever movement of crank 35 is stopped.

In the arrangement above described the exhaust side of the motor is opened before the fluid pressure is admitted to the power side. In some cases it is desirable to open the power ports in advance of the exhaust ports, the fluid trapped in the exhaust side of the motor holding the motor stationary until the fluid pressure has built up and is ready to act when permitted to do so by the opening of the exhaust ports. Such arrangement is shown in Fig. 8 where clockwise movement of sleeve 25 first brings power ports 27 into communication with ports 31a before exhaust grooves 29 are brought into communication with ports 32a. It will be evident that the only change is in the different positioning of ports 31a—32a in the sleeve 30.

It will be understood that various passage arrangements may be used within the valve casing as may be desired, the sleeves controlling one or more passages through the valve casing as needed.

While the form illustrated is adapted for the manual control of such devices as power shovels, the valve of the present invention has a wide application and may be used to control various devices and systems in which both sleeves may be power driven under the control of automatic timers instead of being manually operated.

I claim:

A follow valve comprising an annular casing formed with radial walls dividing the casing into an annular exhaust chamber and two annular service chambers having exhaust and service openings, respectively, through the casing, a fixed hollow cylindrical member extending inwardly from one end of the casing, said member being closed at its inner and open at its outer end, said open outer end providing a power inlet, said member being provided with radial ports within the casing, a sleeve rotatably mounted on said member for unlimited rotation thereon in either direction, two longitudinally spaced ports through said sleeve in constant communication with said power inlet through said radial ports, a longitudinal groove formed on the outer surface of said sleeve, said groove being closed at one end, the other end being open and in constant communication with said exhaust chamber, a second sleeve rotatably mounted on said first sleeve, the ends of both sleeves adjacent the closed end of said fixed cylindrical member being formed with diametrically opposite notches, a cross bar having its ends engaging in the notches of the inner sleeve and having extensions of reduced width engaging in the notches of the outer sleeve to provide limited relative rotation of the sleeves in either direction, a pair of radially and longitudinally spaced ports through said second sleeve, said pair of ports being in constant communication one with each service chamber and positioned to communicate one with one of said first sleeve ports and the other with said longitudinal groove at one extreme of relative movement of the sleeves, and to communicate respectively with said longitudinal groove and the other of said first sleeve ports at the other extreme of said relative movement, portions of the second sleeve closing both of the first sleeve ports and the longitudinal groove from the service chambers when the sleeves are at an intermediate position of relative movement, a shaft connected to said cross bar, manual means for imparting rotation to said shaft, a second cross bar having its ends engaging in the notches of the outer sleeve only, a hollow shaft rotatably mounted on said first shaft and connected to said second cross bar and a driving member connected to said hollow shaft.

EMILE J. CARLETON.

REFERENCES CITED

The following references are of record in the file of this patent:

UNITED STATES PATENTS

| Number | Name | Date |
|---|---|---|
| 620,281 | Cooper | Feb. 28, 1899 |
| 1,605,250 | MacKenzie | Nov. 2, 1926 |
| 1,773,794 | Schneider | Aug. 26, 1930 |
| 1,944,700 | Tait | Jan. 23, 1934 |
| 2,216,800 | Baldenhofer | Oct. 8, 1940 |
| 2,297,975 | Morin | Oct. 6, 1942 |
| 2,349,641 | Tucker | May 23, 1944 |
| 2,369,324 | Thompson | Feb. 13, 1945 |